Oct. 22, 1968  K. S. GOPALAN ET AL  3,407,385
WINKER SYSTEM FOR VEHICLES
Filed June 17, 1965  4 Sheets-Sheet 1
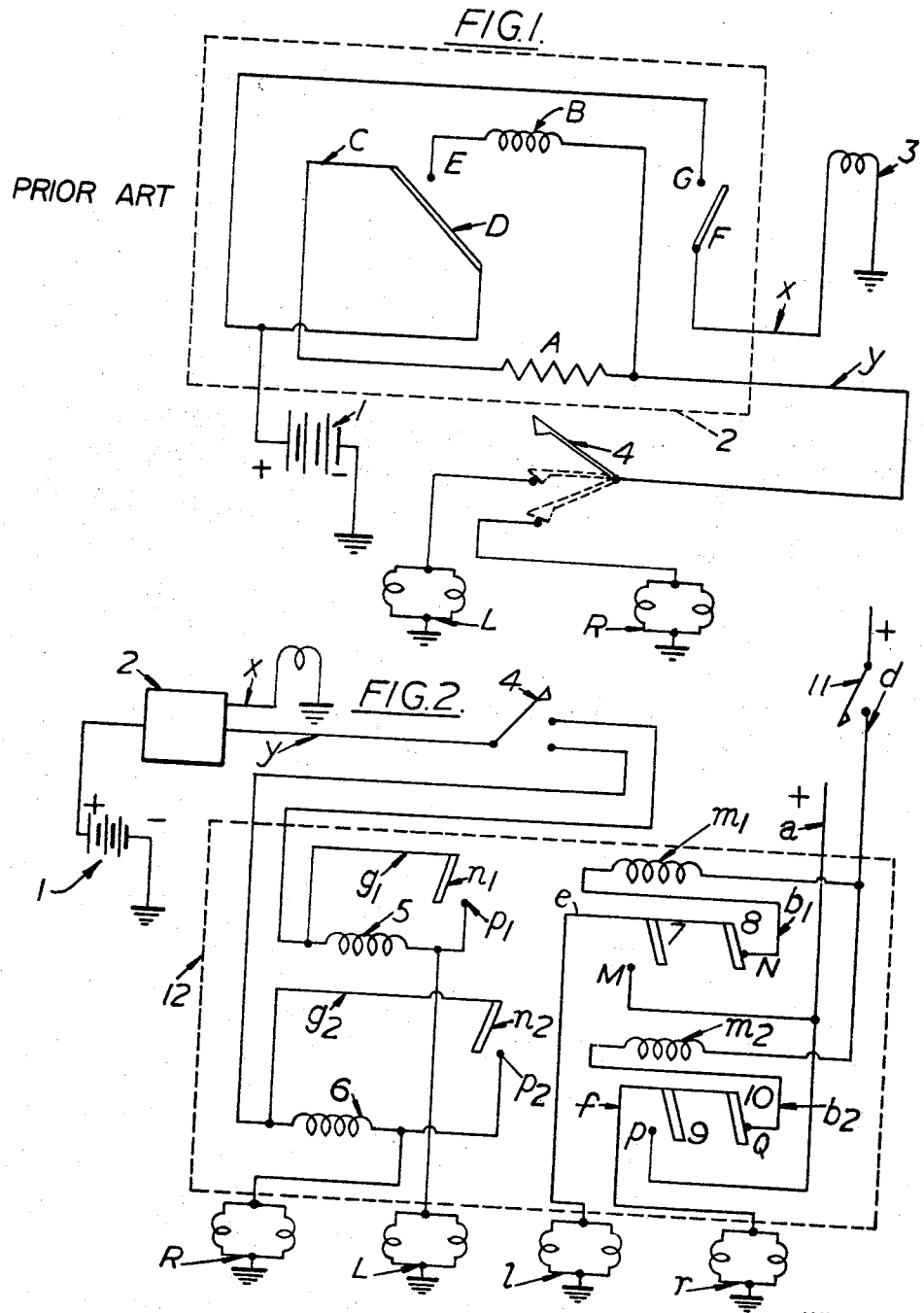
INVENTORS
KASI SAMINATHA GOPALAN,
KASI GOPALA RAMANATHAN &
KASI GOPALA MOHANDAS
BY Marechal, Biebel, French & Bugg
Attorney

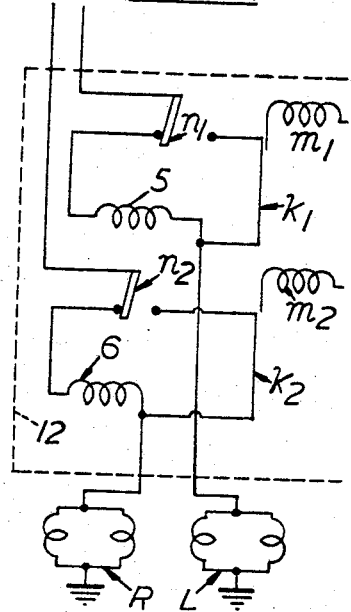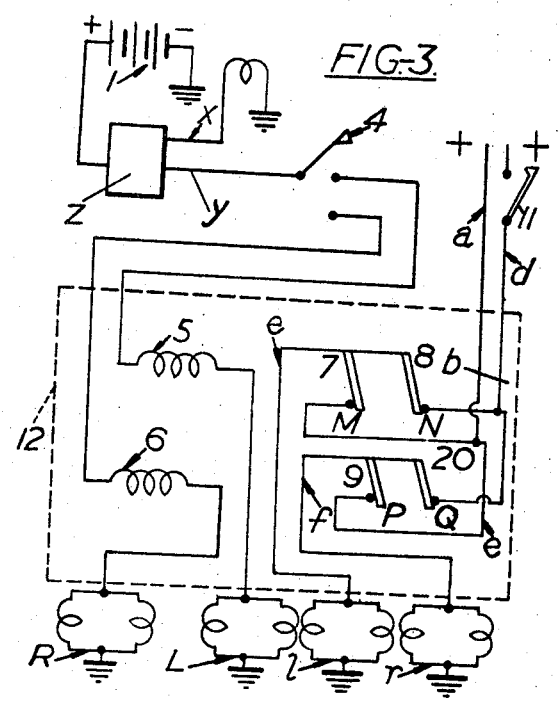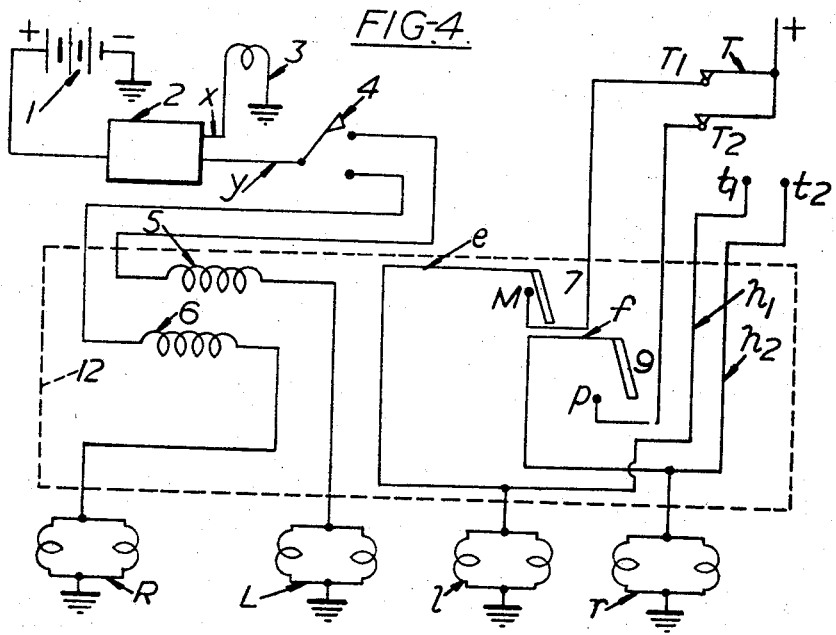

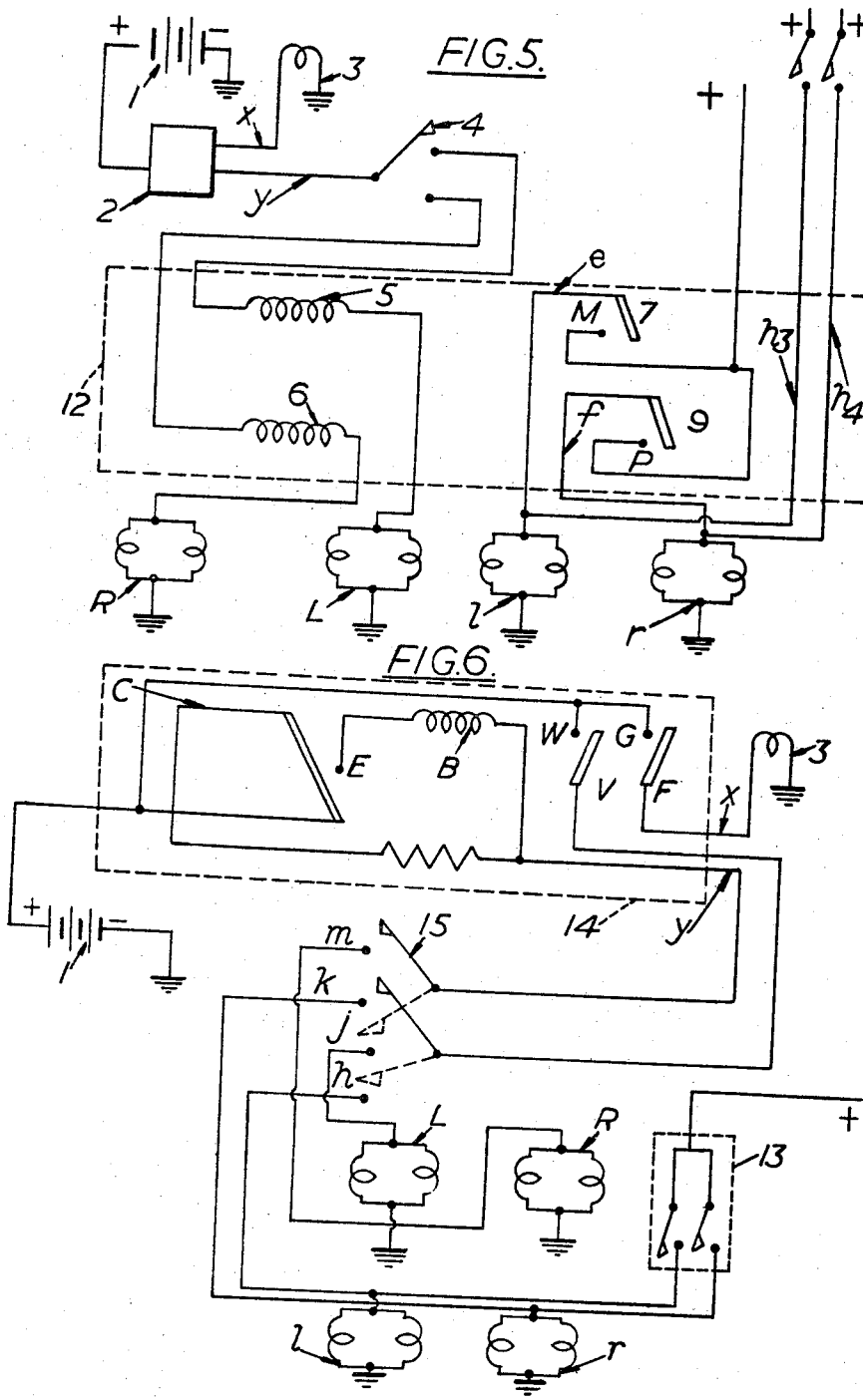

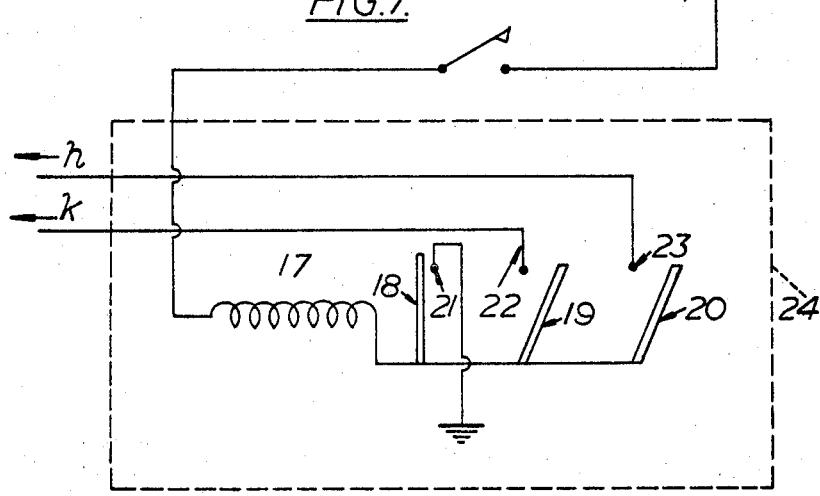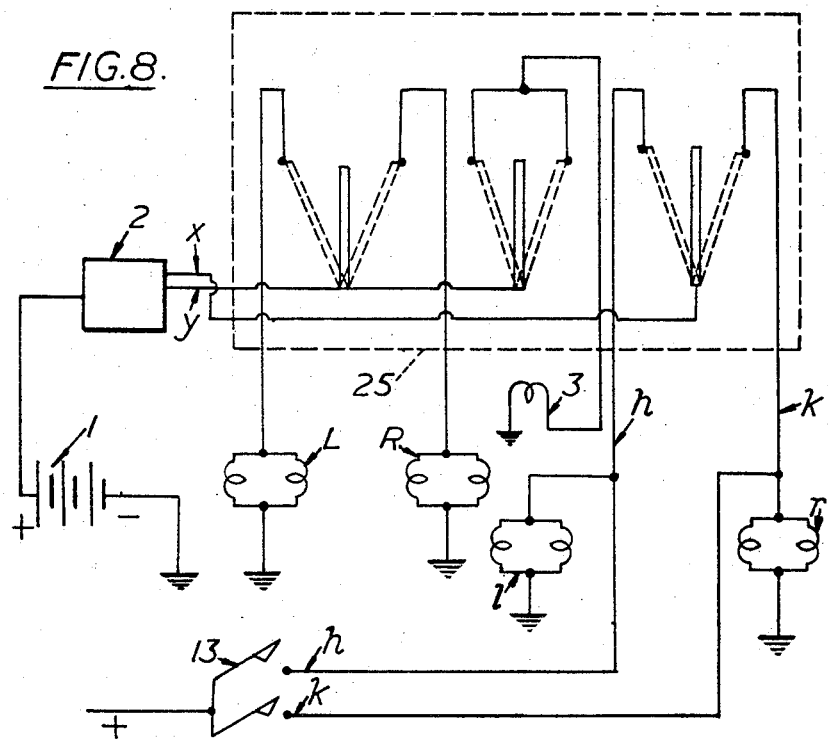

United States Patent Office 3,407,385
Patented Oct. 22, 1968

3,407,385
WINKER SYSTEM FOR VEHICLES
Kasi Saminatha Gopalan, Kasi Gopala Ramanathan, and Kasi Gopala Mohandas, all % SRI M.V.M. Stores, Kumbeswarar Sannadhi, Kumbakonam, Madras, India
Filed June 17, 1965, Ser. No. 464,874
9 Claims. (Cl. 340—81)

ABSTRACT OF THE DISCLOSURE

A vehicle has a DC power source, left and right winking lamps, and left and right side lamps. One circuit connects the winker lamps to the power source and includes a winker and a turn indicator switch, a second circuit connects the side lamps to the power source and includes a control switch for the side lamps, and the first and second circuits are interconnected to produce simultaneous operation of the corresponding winking and side lamps during daytime driving to accentuate a turn signal in bright surrounds and operation of the side lamps independently of the winking lamps during night driving in response to actuation of the control switch.

---

This invention relates to winking light direction indicators used on vehicles such as automobiles.

The conventional types of such indicator known in the art are designed for equal intensity of intermittent light regardless of the surrounding lighting conditions. For instance, during the day, it is felt in practice, that the intermittent light emitted from the winker lights should be accentuated in order to have a compensating effect in bright surroundings to ensure that an observer will not fail to notice the signal from the winker lights, whereas such a stipulation is not warranted at night, for instance, in view of the comparatively darker surroundings and hence the normal glow intensity should suffice.

It is the principal object of this invention, therefore, not only to achieve the above results, which are not possible with the conventional type of indicator, but also to render the working of this invention in so far as the production of the novel effect aforedescribed is concerned, automatic.

This invention achieves its principal objective by means of a system of relays, relay switches and the like which are interconnected with the winker lights and the four side lights of parking lights or the head lights of the vehicle. The description of this invention to follow will refer particularly, though not exclusively, for the sake of definiteness, to the side lights of the vehicle, although the same will be true with regard to the head lights and any other suitable lights with which the vehicle is equipped.

During the day, for instance, the side light switch hereinafter referred to as the light switch, which is used to switch on and off the four side lights of the vehicle, will be open, i.e., in the "off" position, and when the indicator switch is now "thrown" to one side to operate, say the pair of winker lights on the right flank of the vehicle, the pair of the side lights on the same flank of the vehicle will also commence to "wink" in synchronization with the said pair of winker lights. At night, however, the light switch will be closed, i.e., in the "on" position and hence all the four side lights of the vehicle burn steadily. When the indicator switch, which was open, is now "thrown" to any one side to operate the corresponding pair of winker lights the side lights will not be affected and will continue to burn steadily although the said pair of winker lights will be put into operation and commence to "wink."

From the above, it will be noticed that when the light switch is open, and the indicator switch is put on, the winker lights will be supplemented by the side lights on the same flank of the vehicle and that when the light switch is closed, with the indicator switch on, the winker lights alone "wink" while all the four side lights glow steadily, undisturbed.

From what has been stated above it is also evident that the operator need not manipulate any extra controls and that the position of the light switch, i.e., the open or closed position, alone determines automatically whether the "winking" effect should be accentuated or not. Further, as it is common practice in the automobile industry to incorporate a winker light filament and a side light filament in a single bifilament lamp, it will be appreciated that the effect of the winker lights and side lights "winking" in synchronization will be enhanced when bifilament lamps are used on the vehicle. However, the use of monofilament lamps (in which case although a winker light will be placed in close proximity with a side light, the two lights will not be sharing the same lamp) will not detract from the utility of this invention.

Referring to the accompanying drawings in which like reference letters and numerals indicate corresponding parts in the various figures;

FIG. 1 illustrates the conventional indicator system;

FIG. 2 illustrates the first embodiment of this invention;

FIG. 2(a) illustrates an alternative mode of connection of the auxiliary armatures in the first embodiment of this invention;

FIG. 3 illustrates the second embodiment of this invention;

FIG. 4 illustrates a third embodiment of this invention;

FIG. 5 illustrates a fourth embodiment of this invention;

FIG. 6 illustrates a fifth embodiment of this invention;

FIG. 7 illustrates the relay switch; and

FIG. 8 illustrates the seventh embodiment of this invention.

The conventional indicator system will now be described with reference to FIG. 1 of the accompanying drawings in which 1 indicates the normal battery mounted on a vehicle, 2 indicates the conventional winker relay (shown as a unit by the box in dotted outline), 3 indicates the panel indicating light and 4 indicates the single pole double throw switch which serves as the indicator switch. The positive terminal of the battery is connected to the conventional winker relay by a single line and the negative terminal of the said battery is "earthed." D indicates an iron armature, hereinafter referred to as the relay coil armature, connected in series with a taut tension wire C and a high resistance A where A is connected in turn by the external relay line $y$ to the single pole of 4. The relay coil B (whose core is not illustrated) is shunted across the series limb consisting of C and A, leaving the shunt circuit of B open at the relay coil terminal E placed close to D. The current supply to the shunt or the series limb is through D from the single incoming line connected to it. Each of the two output terminals of 4 is connected to a parallel combination comprising a pair of winker lights indicated by L or R, where L indicates the pair of winker lights on the left flank of the vehicle and R indicates the pair of winker lights on the right flank of the vehicle. The panel indicating light 3 is fed power separately by 2 line (tapped from the single incoming line of the conventional winker relay) which incorporates a spring-controlled iron armature, referred to as the panel light armature F, placed close to the electrically live terminal G and also to B. F is connected to one terminal of 3 by the panel supply line $x$, the other terminal of 3 being "earthed."

The manner in which the conventional indicator system works will now be explained with reference to FIG. 1.

When 4 is "thrown" on the line of L, for instance (the line of R being open), the circuit from 1 through D, C, A and L is completed through 4, but the winker lights L do not glow since the high ohmic value of A keeps the current to a low value, although the magnitude of the current is sufficient to heat C and cause it to become slack, thereby allowing D to contact E. The shunt circuit of B is thus completed, and as B provides a path of comparatively much lower resistance, the current through the series limb of C and A is thus short-circuited resulting in the current now flowing through B to the winker lights L, which begin to glow. Simultaneously, B gets energised by the current flowing through it and attracts F towards it thereby allowing F to contact G and thus making 3 glow. The current through the series limb of C and A being now practically zero, C cools down and contracts, drawing D away from E thereby opening the shunt circuit of B and reestablishing the circuit through the said series limb. Simultaneously, the winker lights L go off and F draws away from G (by the tension of its spring) which results in the panel indicating light 3 going off. Hence, as long as 4 is closed on the line of L, the above process repeats in regular succession causing the winker lights L and the panel indicating light 3 to "wink" in synchronization. Similarly with regard to the winker lights R and the panel indicating light 3, when 4 is closed on the line of R, the line of L now remaining open.

A description of this invention with regard to its first embodiment will now be given with reference to FIG. 2 in which the battery 1 and the conventional winker relay 2 are connected in the manner hereinbefore described to the single pole of a double throw type switch 4, which serves as the indicator switch, and the panel indicating light 3. A relay attachment indicated by 12 is illustrated as a single unit by the box in dotted outline, wherein the relay attachment coils 5 and 6 (wound on soft iron cores of high magnetic permeability, said cores not being illustrated) are shown connected to the output terminals of 4 and the pairs of winker lights L and R respectively, the return leads of L and R being "earthed."

A spring controlled pair of armatures 7 and 8 is placed close to the relay attachment coil 5, the tension of the springs acting to keep 7 away from terminal M and to maintain 8 in contact with terminal N, where M is connected directly to the positive of the battery by the lines $c$ and $a$ so that M is maintained always electrically live. N is also connected to the positive of the battery by the lines $b_1$ and $d$ through the auxiliary coil $m_1$ and the single pole single throw switch 11, which serves as the light switch. The pair of armatures 9 and 10 are also spring controlled and placed close to the relay attachment coil 6, the tension of the springs tending to keep 9 away from terminal P and 10 in contact with terminal Q, where P is connected to the battery positive, by the lines $c$ and $a$ directly, so that P is maintained always electrically live. Q is also connected to the battery positive by the lines $b_2$ and $d$ through another auxiliary coil $m_2$ and the light switch 11.

The pair of armatures 7 and 8 is connected by the line $e$ to the pair of side lights $l$ situated on the left flank of the vehicle. Similarly line $f$ connects the two armatures 9 and 10 to the pair of side lights $r$ situated on the right flank of the vehicle. The two side lights of each $l$ and $r$ are connected together in parallel with the common return lead of the parallel combination earthed.

The relay attachment coils 5 and 6 are each shunted by two lines $g_1$ and $g_2$, incorporating respectively the auxiliary armature $n_1$ and terminal $p_1$ and the auxiliary armature $n_2$ and terminal $p_2$, the said armatures $n_1$ and $n_2$ being placed close to $m_1$ and $m_2$ respectively so that when $m_1$ (or $m_2$) is energised, $n_1$ (or $n_2$) establishes contact with $p_1$ (or $p_2$) thus completing the shunt circuit of the line $g_1$ (or $g_2$) and effectively short-circuiting the relay attachment coil 5 (or 6). The armatures $n_1$ and $n_2$ are also spring-controlled so that the tension of their springs tends to keep $n_1$ and $n_2$ away from their respective terminals $p_1$ and $p_2$.

It will also be observed, that the pair of armatures 7 and 8, which is associated with the relay attachment coil 5, is connected to the side lights $l$ situated on the same flank of the vehicle as the winker lights L connected to 5. Similarly, with regard to the pair of armatures 9 and 10 associated with 6.

The manner of working of this embodiment will now be given with reference to FIG. 2:

During the day, for instance, since the four side lights of the vehicle represented by $l$ and $r$ are not used the light switch 11 will be open. Now let it be required to operate the winker lights L, say, situated on the left flank of the vehicle. The indicator switch 4, will therefore, be closed on its output terminal connected to 5 and L. Thus, the conventional winker relay 2 is put into operation, in the manner explained before, and the pair of winker lights L begins to "wink." Now, the winking of L consists of a period when L are aglow followed by a period when L are off, and so on.

Let the period when L are aglow be considered. The relay attachment coil 5 connected to 4 is energised by the current flowing through it and consequently 7 and 8 are drawn towards 5 by magnetic attraction, the shunt line $g_1$ being open, as the auxiliary armature $n_1$ is kept away from its terminal $p_1$ by spring tension. Thus 7 contacts the live terminal M and 8 breaks contact with the terminal N, where the terminal N is dead since 11 is assumed to be open. The circuit from the battery 1 through $a$, $c$, 7, $e$ and $l$ is now completed. The side lights $l$, thus begin to glow simultaneously with L (for practical purposes and making an allowance for quickness of the eye, it can be assumed that L and $l$ begin to glow simultaneously, although there should be a time lag, however, small, between the instant, when L commence to glow and the instant when $l$ commence to glow).

Now let the period during which L are off be considered. Current in 5 will be practically zero, which implies that 5 is deenergised and therefore 7 and 8 are returned back to rest by the tension of the springs. The circuit from 1 through $a$, $c$, 7, $e$ and $l$ will thus be broken and hence the side lights $l$ will go off simultaneously with the winker lights L. The process repeats resulting in L and $l$ "winking" in synchronization. Similarly, when 4 is closed on the line of 6 and R, the winker lights R and the side lights $r$ will "wink" in synchronization. Needless to say, the panel indicating light 3 also "winks" in synchronization with the winker and side lights of either flank of the vehicle when the indicator switch is closed on the corresponding output terminal, as described above.

At night, assuming the indicator switch 4 to be off, the side light switch 11 will be closed by the operator for the purpose of switching on the four side lights of the vehicle and the circuit from 11 through $d$, $b_1$, 8, $e$ and $l$ as also the circuit through $d$, $b_2$, 10, $f$ and $r$ will be completed energizing simultaneously the auxiliary coils $m_1$ and $m_2$ which attract their respective armatures $n_1$ and $n_2$ to complete the shunt circuits of lines $g_1$ and $g_2$ over 5 and 6. Now, $l$ and $r$ commence to glow steadily. When the indicator switch 4 is closed, say on its output terminal corresponding to 5 and L, the winker lights L will commence to wink in the usual manner, but because of the shunt line $g_1$, which has a comparatively much lower resistance than 5, L will receive current supply through $g_1$ and not through 5. The armatures 7 and 8 are thus not disturbed since 5 is not energised and while L and the panel indicating light 3 wink in synchronization, the side lights $l$ and $r$ continue to glow steadily. Similarly, when the indicator switch is thrown on its output terminal corresponding to 6 and R.

In the alternative embodiment shown in FIG. 2a the two auxiliary armatures $n_1$ and $n_2$ will be provided with two terminals each, such that when $m_1$ and $m_2$ are not energised, $n_1$ and $n_2$ will be kept in contact by spring tension respectively with two of their terminals to provide a series path for the current to flow through them and the respective relay attachment coils, and when the auxiliary armatures are attracted by the auxiliary coils, each auxiliary armature would break contact at the terminal aforesaid and establish contact with its other terminal which would cause current to be by-passed through the line $k_1$ or $k_2$ to the winker lights, as illustrated in FIG. 2(a) with exactly the same results.

A second embodiment of this invention will now be described with reference to FIG. 3 of the accompanying drawings, the said embodiment being similar to the one already described but for this difference that the auxiliary armatures and auxiliary coils are not employed, connections being otherwise the same.

The manner in which this embodiment operates will now be given.

During the day, for instance, since the four side lights of the vehicle represented by $l$ and $r$ are not used, the light switch 11 will be open. Now let it be required to operate the winker lights L, say, situated on the left flank of the vehicle. The indicator switch 4 is closed on its output terminal connected to 5 and L. Thus the conventional winker relay 2 is put into operation, in the manner explained before, and the pair of winker lights L begins to "wink." Now, the "winking" of L consists of a period when L are aglow followed by a period when L are off and so on.

Let the period when L are aglow be considered. The relay attachment coil 5 connected to 4 is energised by the current flowing through it and consequently 7 and 8 are drawn towards 5 by magnetic attraction. Thus 7 contacts the live terminal M and 8 breaks contact with the terminal N, where the terminal N is dead since 11 is assumed to be open. The circuit from the battery 1 through $a$, $c$, 7, $e$ and $l$ is now completed. The side lights $l$ thus begin to glow simultaneously with L (for practical purpose and making an allowance for the quickness of the eye, it can be assumed that L and $l$ begin to glow simultaneously although there should be a time lag, however, small, between the instant when L commence to glow and the instant when $l$ commence to glow).

Now, let the period during which L are off be considered, current in 5 will be practically zero, which means that 5 is deenergised and therefore 7 and 8 are returned back to rest by the tension of the springs. The circuit from 1 through $a$, $c$, 7, $e$ and $l$ will thus be broken and hence the side lights $l$ will go off simultaneously with the winker lights L. The process repeats, resulting in L and $l$ "winking" in synchronization. Similarly when 4 is closed on the line of 6 and R, the winker lights R and the side lights $r$ will "wink" in synchronization. Needless to say, the panel indicating light 3 also "winks" in synchronization with the winker and side lights of either flank of the vehicle when the indicator switch is closed on the corresponding output terminal, as described above.

At night, the light switch 11 will be closed by the operator for the purpose of switching on the four side lights of the vehicle and the circuit from 1 through $d$, $b$, 8, $e$ and $l$ as also the circuit $d$, $b$, 10, $f$ and $r$ will be completed. Hence $l$ and $r$ commence to glow steadily. When 4 is now closed, say on its output terminal connected to 5 and L, the winker lights L will commence to "wink" in the usual manner. Now, let the period during which L are aglow be considered, as before. The current flowing through 5 energises it and consequently attracts the armatures 7 and 8 towards it. The armature 7 thus establishes contact with the terminal M while 8 breaks contact with its terminal N, the terminal N being now also live since 11 is closed. Hence, $l$ receive current through M and 7 by the circuit $a$, $c$, 7, $e$ and $l$. Now, let the period during which the winker lights L are off be considered. The current being now practically zero in 5, the armatures 7 and 8 are returned to rest, thus 7 breaking contact at M and 8 establishing contact at N. The terminal N being now live, the side lights $l$ still receive current through N by the circuit $d$, $b$, 8, $e$ and $l$, as before, so that $l$ continue to glow. Now, with regard to the side lights $r$, it is evident that the armatures 9 and 10 being unaffected by 5, the circuit from the battery 1 through $d$, $b$, 10, $f$ and $r$ remains closed so that the said side lights $r$ receive a continuous supply of current which makes them also glow steadily. It will therefore be observed that although L "wink," all the four side lights of the vehicle will continue to glow steadily under the above conditions. The panel indicating light will also "wink" with the winker lights of either flank of the vehicle in the above case. (In this connection, it must be noted that theoretically, under the above conditions, the side lights $l$ (or $r$) should experience a slight flicker when the corresponding armatures get attracted and released, whereas in practice the flicker would be imperceptible. For all practical purposes therefore the side lights $l$ (or $r$) can be assumed to glow steadily, as hereinbefore stated).

In both the above embodiments hereinbefore described it will be noted that the armatures 7 and 8 can be replaced, if necessary, by a single armature which is capable of alternately contacting the terminals M and N. Similarly armatures 9 and 10 can be replaced by one armature capable of contacting the terminals P and Q. In such a case, the manner of working and the results will be the same as if two armatures were used.

A third embodiment of this invention will now be described with reference to FIG. 4.

The circuit connections are similar to those of the second embodiment with the difference that only one spring-loaded armature and a terminal are provided for each relay attachment coil and the light switch is of the double pole double throw type.

The terminals M and P of the armatures 7 and 9 associated with 5 and 6 respectively are independently connected to two of the output terminals $T_1$, $T_2$ corresponding to a "throw" of the light switch T. Two separate lines $h_1$, $h_2$ are tapped at the input ends of $l$ and $r$ and taken to the remaining two output terminals $t_1$, $t_2$ of T. The input side of T is connected to the positive of the battery.

The manner in which this embodiment works is as follows:

During the day, for instance, the operator, not desiring to use the side lights $l$ and $r$, allows T to remain on the terminals $T_1$, $T_2$, which, with respect to the operator, is the "off" position of the light switch. Terminals M and P are now, therefore, live.

When the indicator switch 4 is now thrown on the line of 5 and L, say, 5 gets energised and deenergised while L commence to wink. Thus, the corresponding armature 7 gets attracted and released, making and breaking contact at M in regular succession causing thereby $l$ to "wink" in synchronization. The panel indicating light also "winks" as before. Similarly when 4 is thrown on the line of 6 and R.

At night, the operator desiring to use the side lights throws T on to the terminals $t_1$, $t_2$ which, with reference to him, is the "on" position. Terminals M and P are now dead and $l$ and $r$ receive power continuously from the battery through T and the lines $h_1$, and $h_2$, causing them to glow steadily. When the indicator switch 4 is now thrown on the line of 5 and L, say, although 7 vibrates due to the action of 5 as before, it will be only contacting the dead terminal M. Hence L and the panel indicating light alone "wink" whereas all the four side lights $l$ and $r$ glow steadily. Similarly when 4 is thrown on the line of 6 and R.

It must be observed that the light switch T is characterised in not having the usual "open" position and can only be thrown either on its output terminals $t_1$, $t_2$ or $T_1$, $T_2$.

A fourth embodiment of this invention will now be described with reference to FIG. 5.

This embodiment is similar to the previous one and differs from it in that the terminals M and N are connected directly to the battery positive and the light, switch S is of the double pole single throw type. Two separate lines $h_3$, $h_4$ tapped from the input ends of $l$ and $r$ are connected to the output terminals of S, the input end of S being connected to the battery positive.

During the day, S will be open and when 4 is used to operate a pair of winker lights, the corresponding pair of side lights and the panel indicating light "wink" in synchronization.

At night S will be closed by the operator and all the four side lights $l$ and $r$ will glow steadily receiving power continuously from the battery through S and $h_3$, $h_4$. When 4 is used to operate any pair of winker lights, the panel indicating light and the said winker lights alone "wink" in synchronization while $l$ and $r$ continue to glow steadily. It will be observed that although 7 (or 9) will vibrate when 5 (or 6) is energised and deenergised by intermittent current flowing through it, it will not affect the steady glow of $l$ (or $r$), as $l$ and $r$ receive power independently, as described.

A fifth embodiment of this invention will now be described with reference to FIG. 6 of the accompanying drawings, in which the improved winker relay is indicated by 14, where 14 consists of the same construction as the conventional winker relay and is provided with an additional spring-controlled iron armature V placed in close proximity with the relay coil B and also with a terminal W, connection to W being tapped from the incoming line of 14. V is connected externally to one of the poles of 15, which is the indicator switch of the double pole double throw type, and the relay line $y$ of the improved winker relay is connected to the other pole of 15, as illustrated. Connections from the battery 1 to 14 and from 14 to 3 are similar to what has been hereinbefore described. The output terminals $m$ and $k$ of 15, which correspond to a "throw" of 15 to one side, are connected respectively to R and $r$ while the other two terminals $j$ and $h$ which correspond to the "throw" of 15 to the other side, are respectively connected to L and $l$. The side lights $l$ and $r$ receive power independently when necessary from the battery through a double pole single throw switch, which serves as the light switch, indicated by 13. The return leads of L, R and $l$, $r$ are earthed as hereinbefore described.

The manner in which this embodiment operates will now be explained with reference to FIG. 6.

During the day, it will be assumed that 13 is open, and when 15 is now "thrown on" the terminals $j$ and $h$, for instance, 14 is put into operation. Thus V gets attracted and released in succession and hence power is supplied intermittently to the pair of side lights $l$ through the output terminal $h$ of 15. Simultaneously, the relay line $y$ supplies intermittent power to the pair of winker lights L through $j$, due to reasons which have been hereinbefore explained. Also, 3 gets power intermittently from the panel supply line $x$. Thus L and $l$ and the panel indicating light 3 "wink" in synchronization. Similarly with regard to the side lights and the winker lights $r$ and R, when 15 is "thrown" to the other side.

At night, the operator closes the double pole single throw switch 13, which causes all the four side lights $r$ and $l$ to receive a continuous supply of current and thus glow steadily. When 15 is now closed on the terminals $j$ and $h$, for instance, the winker lights L will "wink" along with 3, but for four side lights $l$ and $r$ continue to glow steadily. Similarly, when 15 is "thrown" to the other two terminals $m$ and $k$, the pair of winker lights R alone "winks" (whereas all the four side lights glow steadily) along with 3.

A sixth embodiment of this invention will now be described with reference to FIG. 7 of the accompanying drawings, in which 24 indicates the relay switch, 17 indicates the relay switch coil and 18, 19 and 20 indicate the three spring-controlled armatures with their respective terminals 21, 22 and 23. The terminal 21 is "earthed" and the terminals 22 and 23 are connected to the output lines of terminals $k$ and $h$ of the indicator switch 15 of the fifth embodiment replacing thus the double pole single throw switch 13 by 24. A single line from the positive of the battery is connected to the input end of 17 through a single pole single throw switch 11, which serves as the light switch in this embodiment.

When the operator closes 11, the circuit from the battery through 11, 17, 18 and 21 is completed. Thus 17 gets energised and draws 18 towards it, so that 18 breaks contact at 21, and also attracts the other two armatures 19 and 20 towards it such that 19 now establishes contact with 22, and 20 with 23. Hence the side lights $r$ and $l$ receive current through the relay switch from its two outgoing lines connected to the lines of $k$ and $h$. When, however, the light switch is opened, the relay switch coil gets deenergised and the armatures 19 and 20 spring away from their respective terminals 22 and 23 while the armature 18 is brought back to its original position in contact with 21, by the tension of its spring. The manner of working of this embodiment with regard to other details is the same as that of the embodiment illustrated in FIG. 6.

An alternative construction of the relay switch (not illustrated) as described, would be to eliminate the armatures 19 and 20 and place the terminals 22 and 23 close to 18, so that when 18 breaks contact at 21 as hereinbefore described, it establishes contact with both the terminals 22 and 23 simultaneously.

A seventh embodiment of this invention will now be described with reference to FIG. 8 of the accompanying drawings:

In this embodiment the conventional winker relay is connected to the battery and through a triple pole double throw switch to the winker and side lights and the panel indicating light.

In FIG. 8, 25 indicates the triple pole double throw switch which serves as the indicator switch. The relay line $y$ of 2 is connected to one of the poles of 25 and the two pairs of winker lights are connected to the output terminals corresponding to the said pole. The line $y$ is also connected to another pole of 25, the output terminals of the said pole being connected to the panel indicating light 3. The panel supply line $x$ is connected to the third pole of 25 and the corresponding two output terminals are connected to the two pairs of side lights. A double pole single throw switch 13 serves as the light switch and is capable of supply current continuously to the two pairs of side lights through the battery.

Thus, when the light switch 13 is open, as it will be in the day, and 25 thrown to any one side, the panel indicating light, one pair of winker lights and the corresponding pair of side lights on the same flank of the vehicle will "wink" in synchronization. At night, 13 being closed by the operator, all the four side lights will be glowing steadily. When 25 is "thrown" to any one side the side lights will not be affected but the corresponding pair of winker lights will "wink" in synchronization with the panel indicating light.

An eighth embodiment of this invention (not illustrated) consists in replacing the double pole single throw light switch of the seventh embodiment by the relay switch, in the manner described under the sixth embodiment.

From FIG. 8, it will be noted that the panel indicating light 3 receives power from the relay line $y$ of the conventional winker relay 2. Alternatively, the panel indicating light can be supplied power from the panel supply line $x$ along with the two pairs of side lights. In such a case, when the light switch is closed and the indicator switch 25 are also closed, the panel indicating light 3 will not "wink" (as in the seventh and eighth embodiments) but will glow steadily (as long as the indicator switch is closed) with the side lights, as it receives a steady supply from the battery through the light switch just as in the case of the side lights.

In the description of this invention although particular mention has been made of the side lights, it shall be noted that other lights (such as lights specially provided for supplementing the winker lights) can be used in place of the side lights to accentuate the "winking" effect.

The "hold over" time which is the period during which the winker lights remain glowing before going off can be varied to suit particular requirements by adjusting the proximity of the relay coil armature to the relay coil terminal in the conventional and improved winker relays.

The chief advantages of this invention are as follows:

(1) The accentuated "winking" effect in bright surroundings can prevent even fatal traffic accidents, which are often caused because motorists/pedestrians fail to see the signal from the winker lights of the conventional indicator.

(2) There are no extra controls for the operator to manipulate as the whole process by which the "winking" effect is accentuated when the surroundings are bright, and automatic.

(3) At night, the side lights of the vehicle glow steadily, although the winker lights function. This is in full conformity with the traffic rules everywhere.

(4) Few extra components are needed for this invention over those of the standardized types available in the market. Thus, while the dealer does not have to invest in a wide range of components, the manufacturer is also not hindered in mass production.

(5) Motor vehicles already provided with the conventional indicator can be attached with the necessary extra components relating to this invention and thus enjoy the benefits of the improved indicator system. Thus the conventional indicator already installed need not be scrapped but can be supplemented by the components of this invention according to any one of the various embodiments hereinbefore described.

We claim:

1. In a vehicle including a direct current power source, left and right winking lamps, and left and right side lamps, a winking system comprising first circuit means for connecting said winking lamps to said power source and including a winker and a turn indicator switch, second circuit means for connecting said side lamps to said power source and including a side lamp control switch, and means interconnecting said first and second circuit means for producing synchronized operation of the corresponding said winking and side lamps during day driving to accentuate a turn signal in bright surroundings and operation of said side lamps independently of said winking lamps during night driving in response to actuation of said control switch for said side lamps.

2. A winker system as defined in claim 1 wherein said first circuit means includes a relay coil and a relay armature for each of said left and right winker lamps, said second circuit means includes a relay coil and a pair of armatures for each of said left and right side lamps, each of said armatures being adapted to establish contact with a terminal, one of said terminals for each pair of armatures in said second circuit connected directly to said power source, the other of said terminals for each pair of armatures connected to said power source through one of said relay coils and said side lamp control switch, each coil in said second circuit being adapted to actuate the corresponding armature in said first circuit, and each of said pair of armatures in said second circuit being actuated by the corresponding said relay coil in said first circuit.

3. A winker system as defined in claim 2, wherein each said armature in said first circuit means is operable to short circuit one of said relay coils in said first circuit when the corresponding coil in said second circuit means is energized by closing of the side lamp control switch.

4. A winker system as defined in claim 1 wherein said first circuit means comprises a relay coil for each of said left and right winker lamps, and said second circuit means comprises a pair of armatures for each of said left and right side lamps, each of said armatures being adapted to establish contact with a respective terminal, one of said terminals of each said pair of armatures in said second circuit connected directly to said power source, and the other of said terminals connected to the said power source through the side lamp control switch.

5. A winker system as defined in claim 1, wherein said first circuit means comprises a relay coil for each of said left and right winker lamps, and said second circuit means comprises an armature for each of said left and right side lamps, each said armature being adapted to establish contact with its terminal when the corresponding said relay coil in said first circuit means is energized, said terminal of each said armature in said second circuit being connected to said power source through said side lamp control switch in the off position, and said side lamps adapted to be connected directly to the said power source through the said side lamp control switch in the on position.

6. A winker system as defined in claim 1, wherein said first circuit means comprises a relay coil for each of said left and right winker lamps, said second circuit means comprises an armature for each of said left and right side lamps, each said armature being adapted to establish contact with its respective terminal when the corresponding said relay coil in said first circuit is energized, said terminal of each said armature connected directly to the said power source, and said side lamps connected to said current source through said side lamp control switch.

7. A winker system as defined in claim 1 wherein said indicator switch comprises a double pole-double throw switch, said winker includes a coil and an armature adapted to establish contact with a terminal connected to the said power source when said coil is actuated, said armature connected to said indicator switch, said first circuit means comprises two lines for said left and right winker lamps, said lines connected to said indicator switch, said second circuit means comprises two other lines for said left and right side lamps and also connected to the said indicator switch, and said side lamps connected to said power source through said side lamp control switch.

8. A winker system as defined in claim 7, wherein said control switch for said side lamps includes a relay switch and a side lamp switch, said relay switch including three armatures and a relay coil, one end of said coil connected to said power source through the said side lamp switch which is adapted to energize said relay coil, the other end of said relay coil is connected to the said three armatures, one of said armatures in normal contact with a grounded terminal when the said relay coil is not energized, and said one armature being adapted to break contact with its terminal and the other said armatures being adapted to make contact simultaneously with their respective terminals when said relay coil is energized to supply power to the side lamps.

9. A winker system as defined in claim 1 wherein said indicator switch comprises a triple pole-double throw switch, said first circuit means includes two lines for said left and right winker lamps and connected to the contacts of one of said poles of said indicator switch, said second circuit means includes two other lines for said left and right side lamps and connected to the contacts for another pole of the said indicator switch, a panel lamp connected to the contacts of the third said pole of said indicator switch, and said side lamps also connected to the said power source through said side lamp control switch.

No references cited.

JOHN W. CALDWELL, *Primary Examiner.*

ALVIN H. WARING, *Assistant Examiner.*